(12) United States Patent
Kim et al.

(10) Patent No.: US 10,863,126 B2
(45) Date of Patent: Dec. 8, 2020

(54) CMOS IMAGE SENSOR SYSTEMS USING LOW-POWER MULTI-MODE DATA PATH AND METHODS OF PROCESSING THE SAME

(71) Applicant: RESEARCH & BUSINESS FOUNDATION SUNGKYUNKWAN UNIVERSITY, Suwon-si (KR)

(72) Inventors: Sang Hoon Kim, Suwon-si (KR); Jae Hyuk Choi, Suwon-si (KR); Jung Hoon Chun, Seoul (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 4 days.

(21) Appl. No.: 16/435,739

(22) Filed: Jun. 10, 2019

(65) Prior Publication Data
US 2019/0379849 A1    Dec. 12, 2019

(30) Foreign Application Priority Data
Jun. 11, 2018    (KR) .................. 10-2018-0066737

(51) Int. Cl.
*H04N 5/374*    (2011.01)
*H04N 5/361*    (2011.01)

(52) U.S. Cl.
CPC ............. *H04N 5/374* (2013.01); *H04N 5/361* (2013.01)

(58) Field of Classification Search
None
See application file for complete search history.

(56) References Cited

U.S. PATENT DOCUMENTS

| 5,959,598 | A  | * | 9/1999 | McKnight | ................. G06T 3/40 345/87 |
| 7,317,480 | B1 | * | 1/2008 | Cho | .................... H03M 1/1019 341/172 |
| 2003/0079117 | A1 | * | 4/2003 | Wise | ....................... G06F 13/28 712/300 |

(Continued)

FOREIGN PATENT DOCUMENTS

| KR | 10-2006-0093913 A | 8/2006 |
| KR | 10-1509433 B1 | 4/2015 |

(Continued)

OTHER PUBLICATIONS

Korean Office Action dated Jul. 29, 2019 in corresponding Korean Application No. 10-2018-0066737 (9 pages in Korean).

*Primary Examiner* — James M Hannett
(74) *Attorney, Agent, or Firm* — NSIP Law

(57) ABSTRACT

Provided are a CIS system and a method of processing the same using a low power multi-mode data path. In order to drive a circuit with low-power, the CMOS Image Sensor (CIS) system rearranges and transmits data in consideration of a color of pixel data and a most significant bit (MSB) and a least significant bit (LSB) of the pixel data using a low-power multi-mode data path. The CIS system can implement multi-modes including a low power mode and a high speed mode, reduce the number of data transitions by merging data of the same color in a always-on low-power mode and a photo-shooting low-power (PS-LP) mode to reduce power consumption and process data in a high speed using a pipeline in a photo-shooting high-speed (PS-HS) mode.

19 Claims, 10 Drawing Sheets

(56) References Cited

U.S. PATENT DOCUMENTS

2006/0227228 A1 10/2006 Nam
2010/0060765 A1 3/2010 Kim et al.
2016/0037110 A1 2/2016 Choi et al.
2018/0109747 A1 4/2018 Chae et al.

FOREIGN PATENT DOCUMENTS

| KR | 10-2016-0015104 A | 2/2016 |
| KR | 10-1631622 B1 | 6/2016 |
| KR | 10-2018-0043070 A | 4/2018 |

* cited by examiner

FIG. 2

| | Conventional 10 | PS - HS (Using pipeline) 20 | PS - LP / AO - LP 30 |
|---|---|---|---|
| $(2a-1)^{th}$ row | | | |
| $(2a)^{th}$ row | | | |
| Avg. color transition per row (# of column: n) | $((n-1) + (n-1))/2 = n-1$ | $((n-1) + (0.5n-1))/2 = 0.75n-1$ | $(0 + (0.5n-1))/2 = 0.25n-0.5$ |

× 0.75 → × 0.25 → × 0.33

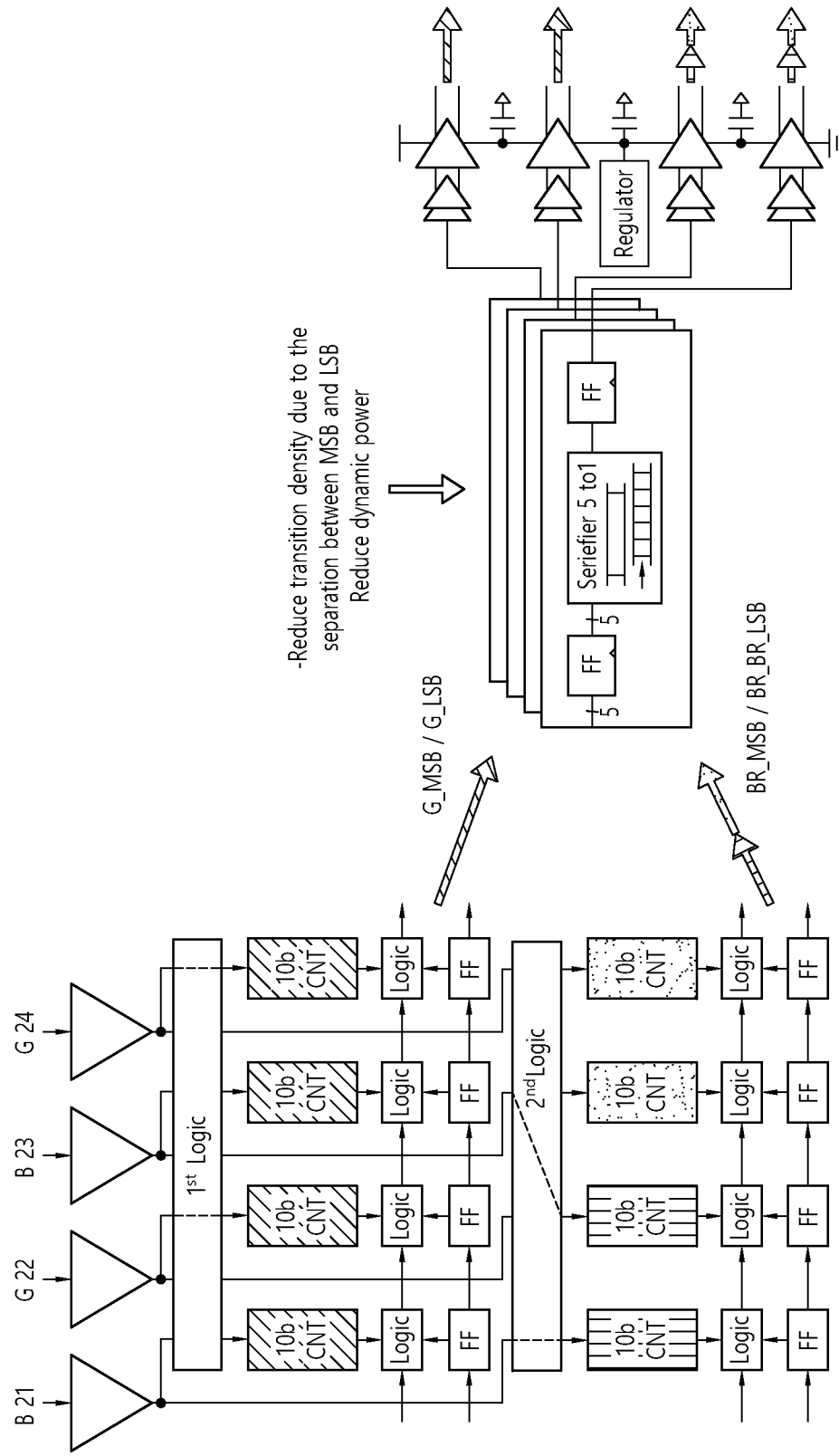

CMOS IMAGE SENSOR SYSTEMS USING LOW-POWER MULTI-MODE DATA PATH AND METHODS OF PROCESSING THE SAME

CROSS-REFERENCE TO RELATED APPLICATIONS

This application claims priority to Korean Patent Application No. 10-2018-0066737 filed on Jun. 11, 2018 in Korea, the entire contents of which are hereby incorporated by reference in their entirety.

BACKGROUND

1. Technical Field

The present disclosure relates to complementary metal-oxide semiconductor (CMOS) Image Sensor (CIS) systems and methods of processing the same using a low power multi-mode data path.

2. Description of Related Art

A CIS is a low consumption power type image pickup device having a CMOS structure and performs a function of, for example, a kind of electronic film in an electronic digital device such as a camera phone, a web camera, and a small medical photographing equipment.

A CIS system is a device that converts an image to an electrical signal to reproduce the electrical signal on a screen using a plurality of CISs and includes a digital still camera that reproduces a still image on a screen and a camcorder that reproduces a moving picture on a screen. The CISs convert an optical signal input from the outside to an electrical signal using the CMOS transistors formed with the number corresponding to the number of pixels on a semiconductor substrate.

Recently, while being provided in a smart phone, a vehicle, and a wearable device, a virtual/augmented reality (VR/AR) device, and an Internet of Things (IoT) device, a role of the CIS increases. Conventionally, when a user wants to take a picture, the user operates an image sensor, but in the present, in order to obtain continuous image information, a function of continuously operating the image sensor is required.

Accordingly, in a smart phone, a tablet computer, and a wearable device, a demand for a CIS increases and in such devices, in order to increase an available time of an application that uses a battery, a power consumption amount is very important. Further, in the CIS, there is a problem that when a temperature of a sensor stage rises, a dark current increases and thus a noise characteristic is deteriorated.

In order to obtain a good image, even if a conventional CIS has large power consumption, the conventional CIS regarded a high SNR and a dynamic range as an important element. However, because the CIS should operate during a long time period, power consumption becomes a most important factor. In order to drive the CIS with low power, logic and circuit technique of lowering a supply voltage and reducing power are required.

In particular, a conventional image sensor performs data processing regardless of characteristics of CIS data similar to pixel data between adjacent pixels to waste an unnecessary dynamic current and thus there is a problem that power consumption occurs.

SUMMARY

A CIS system and a method of processing the same using a low power multi-mode data path according to the present disclosure have the following objects.

First, exemplary embodiments of the present disclosure improves characteristics of the CIS system by driving with low power using a multi-mode data path.

Second, exemplary embodiments of the present disclosure corresponds to various modes such as a low power mode and a high resolution mode through a multi-mode data path.

The objects of the present disclosure are not limited to the above-described objects and the other objects will be clearly understood by those skilled in the art from the following description.

A CIS system according to exemplary embodiments of the present disclosure for achieving the above objects may be characterized by being driven with low power using a multi-mode data path. The CIS system of the present disclosure may be processed with low power and a high speed to correspond to various modes such as a low power mode and a high resolution mode through a multi-mode data path.

In an aspect, a CIS system according to exemplary embodiments of the present disclosure may include a pixel array for outputting pixel data of mergeable 4-shared pixel arrays with arrangement of a plurality of pixels; a data arrangement unit having a single data arrangement module to correspond to each of the 4-shared pixel arrays and for merging pixel data of the same color in another row of the 4-shared pixel arrays to rearrange the data in a low power mode; a data reading unit for performing an exclusive-OR operation of data output from the data arrangement unit to discharge and pre-charge the data when an input voltage of a sense line pull-down circuit is equal to or higher than a high level; and a data transmitting unit for dividing and transmitting data of the most significant bit (MSB) side and data of the least significant bit (LSB) side of data having the same color among data read by the data reading unit.

In an example embodiment, the data arrangement unit may be configured to process to reduce the number of transitions using a unique transition characteristic of the most significant bit (MSB) between adjacent pixel data in a high speed mode.

In another example embodiment, the data arrangement unit may be configured to arrange data of the same color in all of buffers of two layers in a low power mode and to output the data to the data reading unit, and to alternately arrange data in the buffers of two layers to output the data to the data reading unit in a high speed mode.

In another example embodiment, the low power mode may include an always-on low-power (AO-LP) mode and a photo-shooting low-power (PS-LP) mode, and the high speed mode may include a photo-shooting high-speed (PS-HS) mode.

In another example embodiment, the data arrangement unit may include an analog multiplexer for determining whether to merge pixel data according to an entire mode using the 4-shared pixels and merging pixel data of the same color positioned in another row; a programmable gain amplifier for adjusting a gain; a comparator including an analog-to-digital converter (ADC) for digitizing analog data; and a read-out circuit for outputting to distinguish data according to a color and multi-modes including the low power mode and the high speed mode.

In another example embodiment, the analog multiplexer may be configured to sequentially merge first row data and third row data and merge second row data and fourth row data of the 4-shared pixels in the low power mode.

In another example embodiment, the analog multiplexer may perform a sequential by-passing process of first row data to fourth row data of the 4-shared pixels without merging in the high speed mode.

In another example embodiment, the read-out circuit may be configured with a data arrangement block and a data reading block of two layers to correspond to each of the 4-shared pixels.

In another example embodiment, the data arrangement block may include a data path logic for transferring data to any one of buffers of two layers according to multi-modes and a color; and a digital counter for counting data to correspond to each of multi-modes.

In another example embodiment, the data reading block may include a shift register.

In another example embodiment, the data transmitting unit may receive two data streams divided according to each color from the data reading unit to transmit the two data streams to four transmitter data paths.

In another example embodiment, the data transmitting unit may be configured to share a static current of 4-stacked drivers using the 4-stacked drivers in which all of four drivers are stacked.

In another aspect according to exemplary embodiments of the present disclosure, a method of processing data of a CIS system using a low power multi-mode data path. The method of processing data of a CIS system using a low power multi-mode data path may include receiving pixel data of mergeable 4-shared pixel arrays to arrange to output data having the same color in buffers of two layers in a low power mode and alternately arranging and outputting the data in the buffers of two layers in a high speed mode; performing an exclusive-OR operation of the arranged and output data to discharge and pre-discharge the data, when an input voltage of a sense line pull-down circuit is equal to or higher than a high level; and dividing and transmitting data of the most significant bit (MSB) side and data of the least significant bit (LSB) side of data having the same color among the pre-charged data.

In another example embodiment, the arranging and outputting of data may include determining whether to merge the pixel data according to a low power mode and a high speed mode using the 4-shared pixels and merging and analog processing pixel data of the same color positioned in another row.

In another example embodiment, the arranging and outputting of data may include adjusting a gain of the analog-processed data, digitizing the analog data, and outputting to divide data according to each color and multi-modes including the low power mode and the high speed mode.

In another example embodiment, the arranging and outputting of data may include sequentially merging first row data and third row data and merging second row data and fourth row data of the 4-shared pixels in the low power mode.

In another example embodiment, the arranging and outputting of data may include performing a sequential by-passing process of the first row data to the fourth row data of the 4-shared pixels without merging in the high speed mode.

In another example embodiment, the dividing and transmitting of data may include transferring two data streams divided on a color basis in the pre-charged data to four transmitter data paths.

In another example embodiment, the dividing and transmitting of data may include sharing a static current of 4-stacked drivers using the 4-stacked drivers in which all of four drivers are stacked.

BRIEF DESCRIPTION OF THE DRAWINGS

FIG. 2 is a diagram illustrating pixel data according to an operation mode in the CIS system of FIG. 1.

FIG. 10 is a circuit diagram illustrating a configuration of a data transmitting unit of FIG. 1.

DETAILED DESCRIPTION OF EXAMPLE EMBODIMENTS OF THE INVENTION

Figure 1:
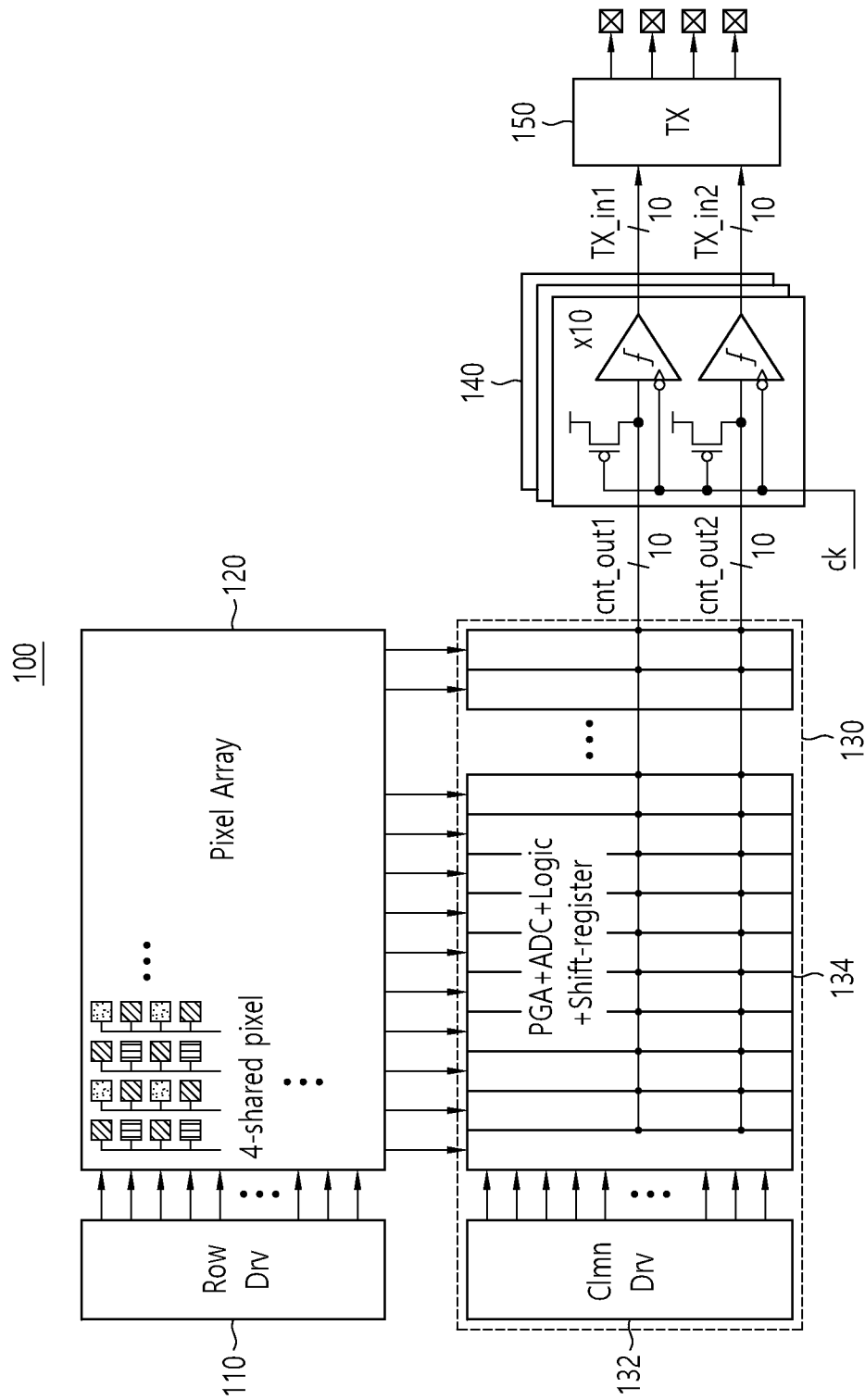
FIG. 1 is a circuit diagram illustrating a configuration of a CIS system according to an example embodiment of the present disclosure.

Hereinafter, example embodiments of the present disclosure will be described in detail with reference to the attached drawings such that the present disclosure can be easily put into practice by those skilled in the art. As a person of ordinary skill in the art can easily understand, the following example embodiment may be changed in various forms within the scope without deviating from a concept and range of the present disclosure. Like reference numerals designate like elements throughout the specification.

Terms used in the present specification are intended to simply describe to a particular example embodiment, but are not intended to limit the present disclosure. Unless the context otherwise clearly indicates, words used in the singular include the plural, the plural includes the singular.

A meaning of "comprising" used in the present specification embodies a specific characteristic, area, integer, step, operation, element, and/or component and does not exclude the presence or addition of another specific characteristic, area, integer, step, operation, element, component, and/or group.

All terms including technical terms and scientific terms used in the present specification have the same meaning as that which may be generally understood by a person of common skill in the art. It is additionally construed that terms defined in a dictionary have meanings corresponding to related technical documents and presently disclosed contents and are not construed as ideal or overly official meanings unless so defined.

In order to drive a circuit with low power, a CIS system according to the present disclosure rearranges and transmits data using a low power multi-mode data path in consideration of a color of pixel data and a Most Significant Bit (MSB) and a Least Significant Bit (LSB) of the pixel data.

The CIS system according to the present disclosure can implement multi-modes including a low power mode and a high speed mode, reduce power consumption by reducing the number of data transitions by merging data of the same color in an always-on low-power mode and a photo-shooting low-power mode, and process data in a high speed using a pipeline in a photo-shooting high-speed mode.

Hereinafter, an example embodiment of the present disclosure will be described in detail with reference to the drawings.

FIG. 1 is a circuit diagram illustrating a configuration of a CIS system according to an example embodiment of the present disclosure, and FIG. 2 is a diagram illustrating pixel data according to an operation mode in the CIS system of FIG. 1.

Referring to FIG. 1, a CIS system 100 according to the present disclosure merges a plurality of pixel data to process the plurality of pixel data with low power using a low power multi-mode data path or to process the plurality of pixel data in a high speed using a pipeline.

For this reason, the CIS system 100 according to the present disclosure includes a low power mode and a high speed mode and implements different data paths according to multi-modes. An operation of the CIS may be largely divided into two. In general, when a user takes a picture is referred to as a Photo-Shooting (PS) mode, and when the CIS system 100 operates in a low power mode in order to receive continuous image information is referred to as an Always-On (AO) mode. In the photo shooting mode, driving of a pixel is performed in row by row, and in the always-on mode, nth and (n+2)th rows and (n+1) and (n+3)th rows, respectively are simultaneously turned on instead of row by row and data are merged. Here, row by row enables to drive one row by one row while moving a signal through a shift register. This is referred to as a rolling shutter and is a basic driving method of an image sensor.

That is, a mode of the CIS system 100 according to the present disclosure is largely divided into a PS mode in which high performance photographing is available and an AO mode in which photographing is available with low-power. The PS mode includes a photo-shooting high-speed (PS-HS) mode and a photo-shooting low-power (PS-LP), and the AO mode includes an always-on low-power (AO-LP) mode operating with low power in order to continuously receive image information. In the PS-HS mode, data are more quickly processed using a pipeline technique. In the AO-LP mode, in order to reduce the number of transitions, pixel data are merged and rearranged.

Specifically, the CIS system 100 according to the present disclosure includes a pixel array 120, a row driver 110, a data arrangement unit 130, a data reading unit 140 (220 of FIG. 3), and a data transmitting unit 150.

The row driver 110 is a circuit for operating the pixel array 120 in a row unit.

In the pixel array 120, a plurality of pixels is arranged vertically and horizontally. Here, pixel data according to the present disclosure are provided with mergeable 4-shared pixel arrays. In the pixel array 120, pixels are driven in a row by row manner. That is, while pixel data are moved through a shift register of the data arrangement unit 130, the pixel data are provided to drive one row by one row.

The data arrangement unit 130 includes a column driver 132 and a plurality of data arrangement modules 134. The data arrangement unit 130 includes a single data arrangement module 134 to correspond to each of 4-shared pixel arrays.

The column driver 132 operates a read-out circuit parallel to a column, such as a programmable gain amplifier (PGA) or an analog-to-digital converter (ADC) of the next stage of a pixel array.

The data arrangement module 134 merges pixel data of the same color in another row using 4-shared pixels from the pixel array 120 or merges and digitizes pixel data in an analog stage to reduce a resolution in order to implement a low power mode and thus ADC processing and additional logic processing frequency decreases, whereby power reduces and an ADC conversion time reduces.

In the present disclosure, as shown in FIG. 2, the number of transitions is reduced using a unique transition characteristic in which pixel data of the same color in a low power mode are merged and rearranged using 4-shared pixels or in which the most significant bits (MSB) are similar and the least significant bits (LSB) are mainly changed between adjacent pixel data in a high speed mode.

That is, referring to FIG. 2, when typical 4-shared pixel data 10, for example, (2a−1)th row pixel data are arranged in G, R, G, and R colors and 2a-th row pixel data are arranged in B, G, B, and G colors, data transition of average (n−1) times occurs. However, in the present disclosure, by rearranging pixel data with the same color as that of adjacent pixel data using a pipeline by the read-out circuit 134, in a high speed mode 20, data transition of 0.75n−1 times occurs, and in a low power mode 30, data transition of 0.25(n−2) times occurs. As a result, a dynamic current in the read-out circuit 134 may be reduced.

The data arrangement unit 130 arranges data of the same color in buffers of two layers in a low power mode, i.e., an always-on low-power (AO-LP) mode and a photo-shooting low-power (PS-LP) mode and outputs the data to the data reading units 140 and 220, and alternately arranges data in buffers of two layers in a high speed mode, i.e., a photo-shooting high-speed (PS-HS) mode and outputs the date to the data reading unit 140.

The data reading units 140 and 220 perform an exclusive-OR (XOR) operation of data output from the buffer and data output from a buffer of a previous column to discharge and pre-charge the data only when an input voltage of a sense line pull-down circuit is equal to or larger than a high level, thereby reducing the number of discharge and pre-charge. However, in only the first column, an exclusive-OR (XOR) operation of a source voltage (VSS) and data output from the buffer is performed.

The data transmitting unit 150 receives two data streams divided according to each color from the data reading units 140 and 220 and transfers the two data streams to four transmitter data paths. The data transmitting unit 150 divides and transmits data of the most significant bit (MSB) side and data of the least significant bit (LSB) side in data having the same color among data read by the data reading units 140 and 220. The data transmitting unit 150 reduces data transitions, thereby reducing dynamic power. The data transmitting unit 150 may share a static current of 4-stacked drivers using the 4-stacked drivers in which all of four drivers are stacked, thereby reducing static power consumption.

Therefore, the CIS system 100 according to the present disclosure enables the pixel array 120 to easily merge the same color pixel data positioned in another row in an analog multiplexer 202 of the data arrangement unit 130 using 4-shared pixels among a plurality of pixels. Further, when reducing a resolution in order to implement a low power mode, after pixel data are merged in an analog stage, because analog-to-digital conversion (ADC) is performed, power consumption can be reduced and an ADC conversion time can be reduced with frequency decrease according to an ADC process and an additional logic process.

Specifically, a configuration of a CIS system according to the present disclosure and a low power and high speed function according to a multi-mode data path will be described in detail with reference to FIGS. 3 to 10.

Figure 3:
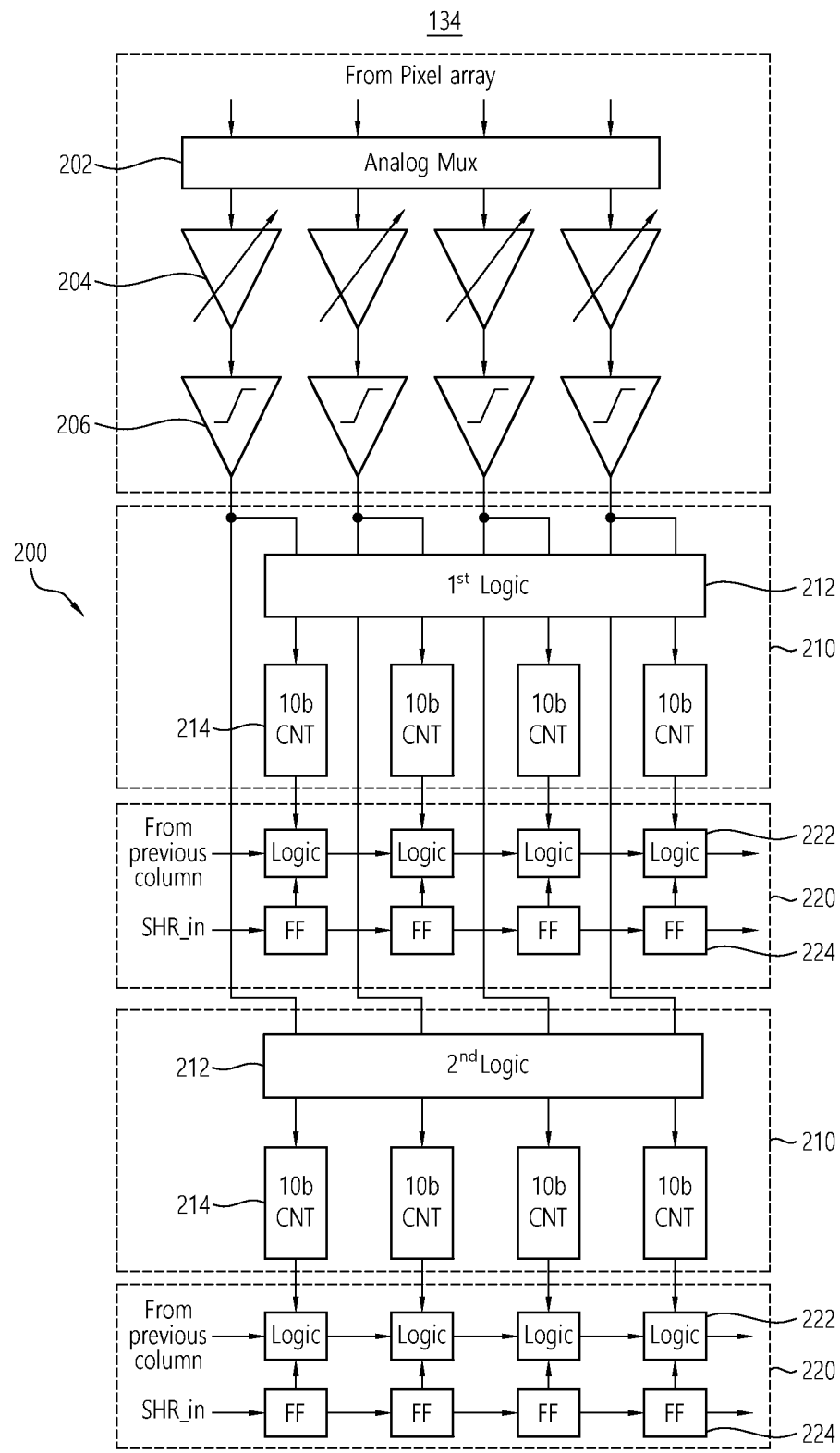
FIG. 3 is a circuit diagram illustrating some configurations of a data arrangement unit of FIG. 1.
Figure 4:
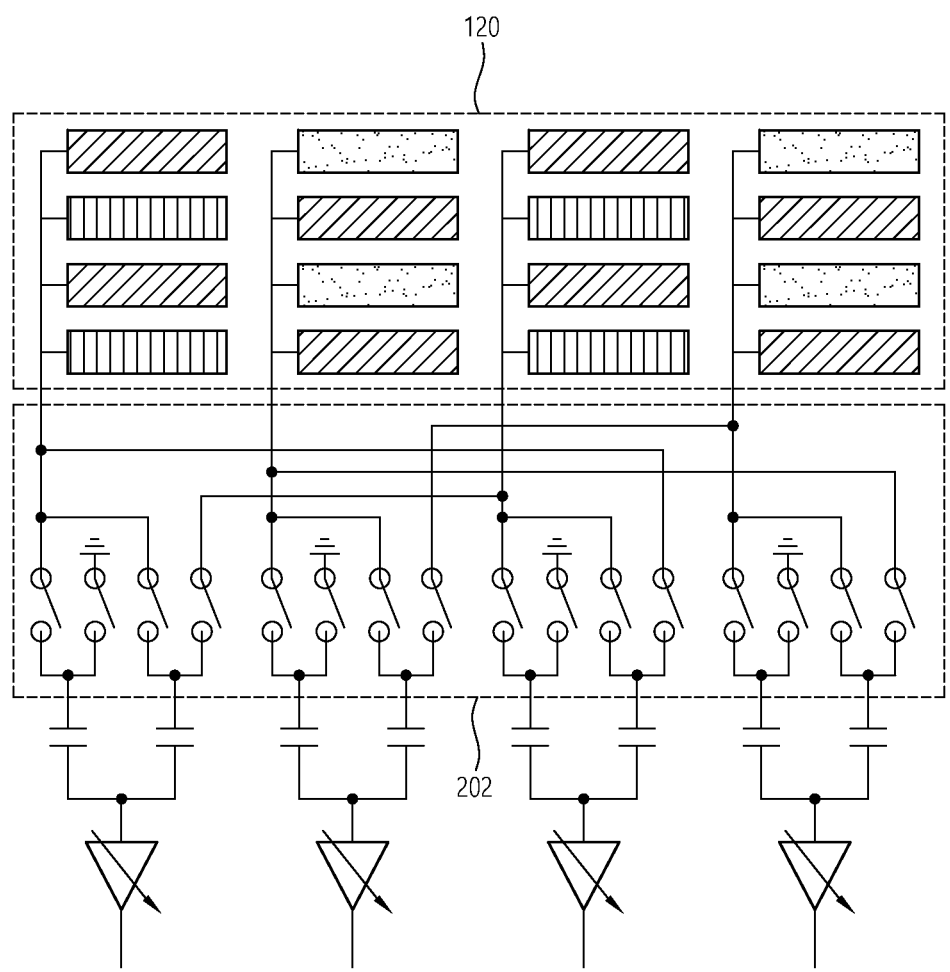
FIG. 4 is a circuit diagram illustrating a configuration of an analog multiplexer of FIG. 3.
Figure 5:
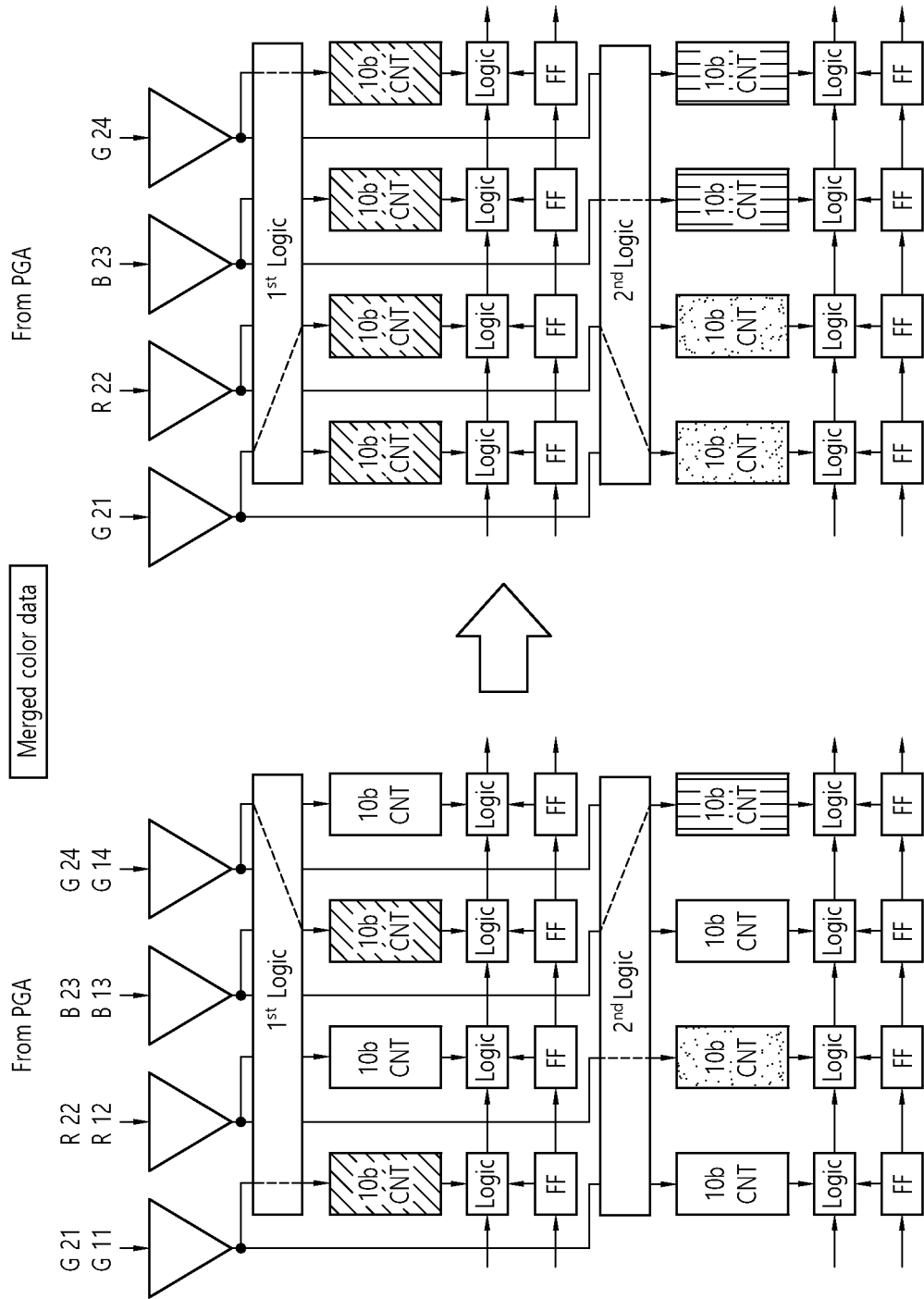
FIG. 5 is a diagram illustrating a pixel data processing process in an always-on low-power mode an example embodiment of according to the present disclosure.
Figure 6:
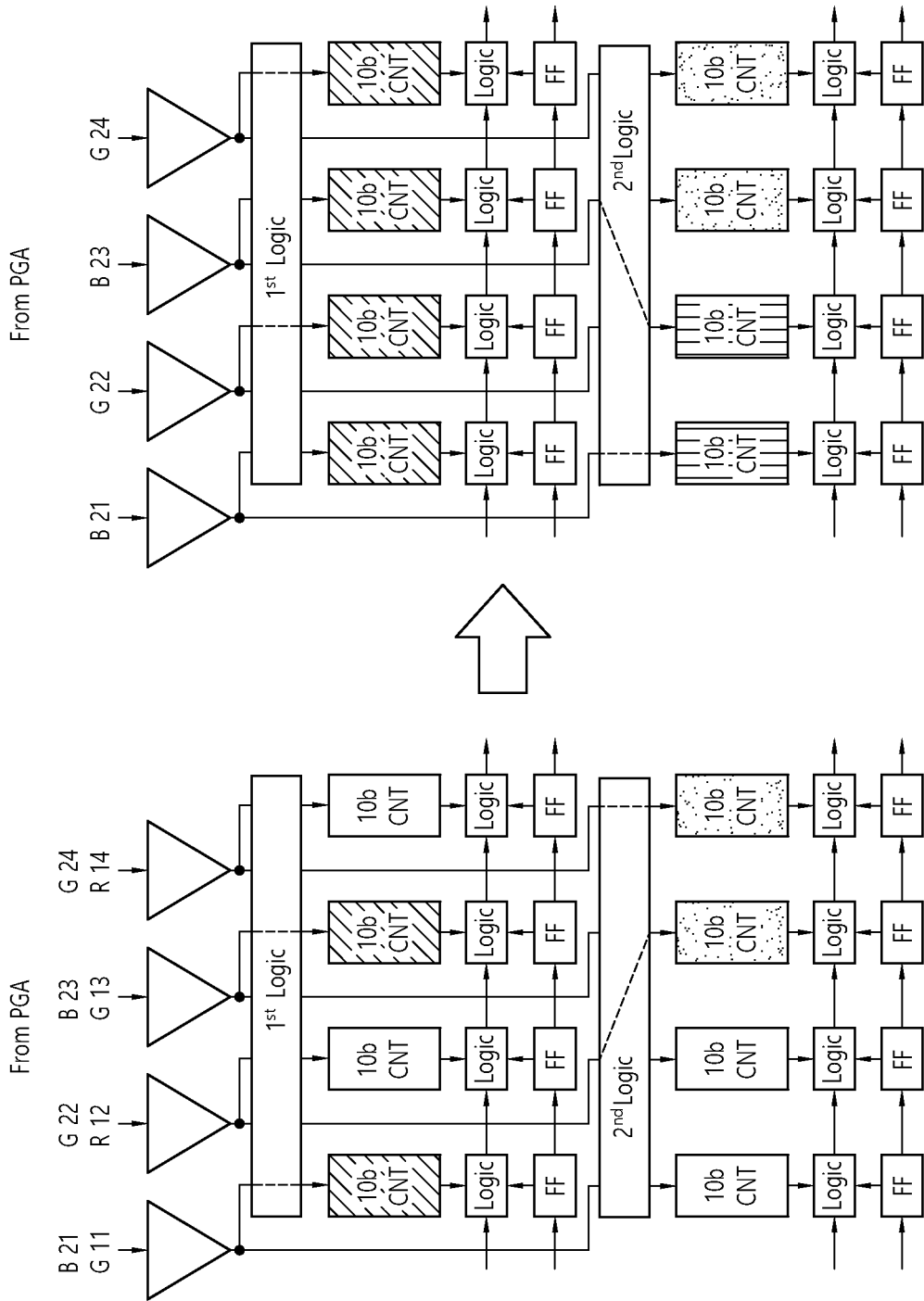
FIG. 6 is a diagram illustrating a pixel data processing process in a photo-shooting low power mode an example embodiment of according to the present disclosure.
Figure 7:
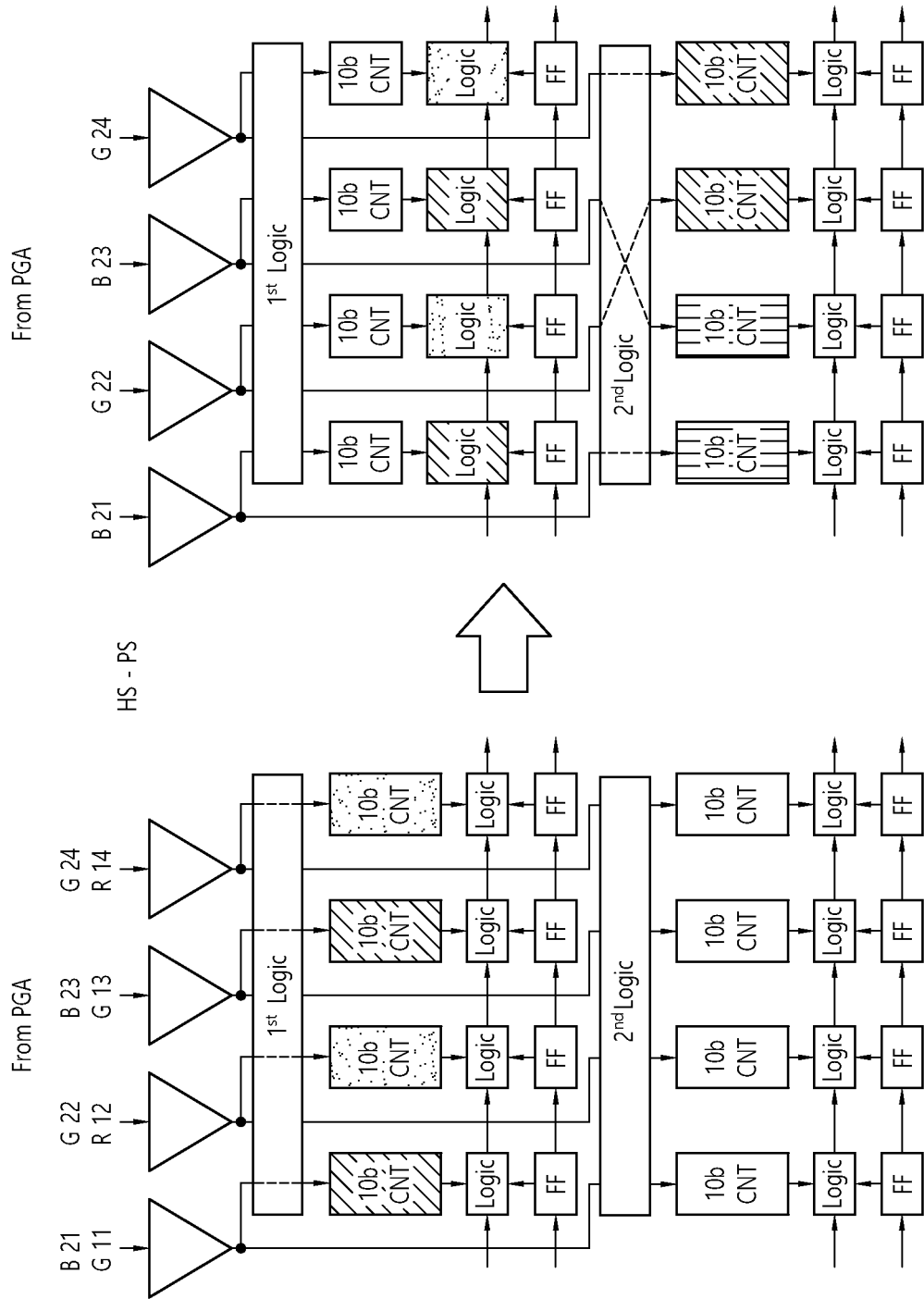
FIG. 7 is a diagram illustrating a pixel data processing process in a photo-shooting high-speed mode an example embodiment of according to the present disclosure.

FIG. 3 is a circuit diagram illustrating some configurations of a data arrangement unit of FIG. 1, FIG. 4 is a circuit diagram illustrating a configuration of an analog multiplexer of FIG. 3, FIG. 5 is a diagram illustrating a pixel data processing process in an always-on low-power mode according to an example embodiment of the present disclosure, FIG. 6 is a diagram illustrating a pixel data processing process in a photo-shooting low-power mode according to an example embodiment of the present disclosure, and FIG. 7 is a diagram illustrating a pixel data processing process in a photo-shooting high-speed mode according to an example embodiment of the present disclosure.

Referring to FIGS. 3 to 7, the data arrangement unit 130 according to the present disclosure includes a data arrangement module 134 as a data-path module for 4-shared pixels, i.e., four column lines.

The data arrangement module 134 includes an analog multiplexer 202 for merging pixel data, a programmable gain amplifier (PGA) 204 for adjusting a gain, a comparator 206 having an analog-to-digital converter (ADC) for digitizing analog data, and one read-out circuit 200 (210 to 220).

The read-out circuit 200 is configured with a data arrangement block 210 and a data reading block 220 of two layers to correspond to each of 4 shared-pixels. That is, the data arrangement block 210 includes a data path logic 212 and a digital counter 214 that enable to divide data according to multi-modes and color. The data reading block 220 includes a shift register. The shift register includes four exclusive-OR logics, a pull-down circuit 222, and fourth flip-flops (FF) 224.

Here, because pixel data are configured with four data of GRBG, in order to collect data on a color basis, the data arrangement block 210 and the data reading block 220 each are provided in two sets. In such a data arrangement module 134, each of the data arrangement block 210 and the data reading block 220 is provided as one module to correspond to 4 shared-pixels and thus the data arrangement module 134 is configured with total four modules.

The analog multiplexer 202 determines whether to merge pixel data according to an entire mode. The analog multiplexer 202 merges pixel data in an always-on (AO) mode and does not merge pixel data in a photo shooting mode.

Specifically, when using 4 shared-pixels, the analog multiplexer 202 determines a data path according to whether merging is performed to correspond to an always-on mode or a photo-shooting mode, as shown in FIG. 4. For example, in the always-on mode, the analog multiplexer 202 sequentially merges first row data and third row data and merges second row data and fourth row data. Further, in the photo-shooting mode, the analog multiplexer 202 does not merge pixel data and sequentially by-passes the first row data to the fourth row data.

Here, an operation of the PGA 204 is performed regardless of whether merging is performed. That is, an operation of the PGA 204 is determined according to whether gain adjustment is performed, and even when merging is not performed, the programmable gain amplifier 204 may be used. Analog data, having passed through the programmable gain amplifier 204 are entered to the comparator 206. In a next stage of the comparator 206, because the buffers 210 and 220 of two layers, i.e., the digital counter 214 and the shift register 220 for separating and processing data according to each color are provided, an output of the comparator 206 is simultaneously connected to each logic 212 in a preceding stage of the buffers 210 and 220 of two layers.

The logic 212 connected to the digital counter 214 selects whether to transfer data to which buffer of the buffers 210 and 220 to correspond to a mode according to a control signal. The digital counter 214 may convert the bit number that may process according to a mode. For example, the present disclosure is designed to process 8 bits and 10 bits, but may be designed to process other bits such as 12 bits or 14 bits in some cases.

Specifically, as shown in FIGS. 5 and 6, it is determined whether to sequentially transfer to each layer according to a mode or to divide and transfer into two layers. In an AO-LP mode and an LP-PS mode, all data of the same color are arranged and output in the buffers 210 and 220 of two layers. In a PS-HS mode, data are alternately arranged and output in the buffers 210 and 220 of two layers.

As shown in FIG. 5, in the AO-LP mode, an operation of the data arrangement unit 130 is as follows. In the corresponding mode, the merged color data become an input of the programmable gain amplifier 204, and data of four rows and four columns are merged to be converted to one merged row data.

When merged data entering to a B-th column and an A-th row based on the comparator 206 of the ADC are D_AB, first merged row data G11 and G14 enter to a first buffer, and R12 and B13 enter to a second buffer. Second merged row data G21 and G24 enter to a blank area of the first buffer, and R22 and B23 enter to the second buffer. Through such a process, merged pixel data are divided and enter to two buffers according to each color. In the case of an LP-PS mode, an operation is performed as shown in FIG. 6, and an operation principle thereof is almost similar to that in the AO-LP mode of FIG. 5.

In a PS-HS mode, as shown in FIG. 7, for fast processing of data, one row data entering to the PGA 204 regardless of a color using a pipeline technique are alternately transferred to each of two buffers. After the ADC processes data in one buffer, the processed digital data are transferred to an SHR, and while data are transmitted to the SHR, another data are transferred to the remaining one buffer and the ADC processes the data.

Figure 8:
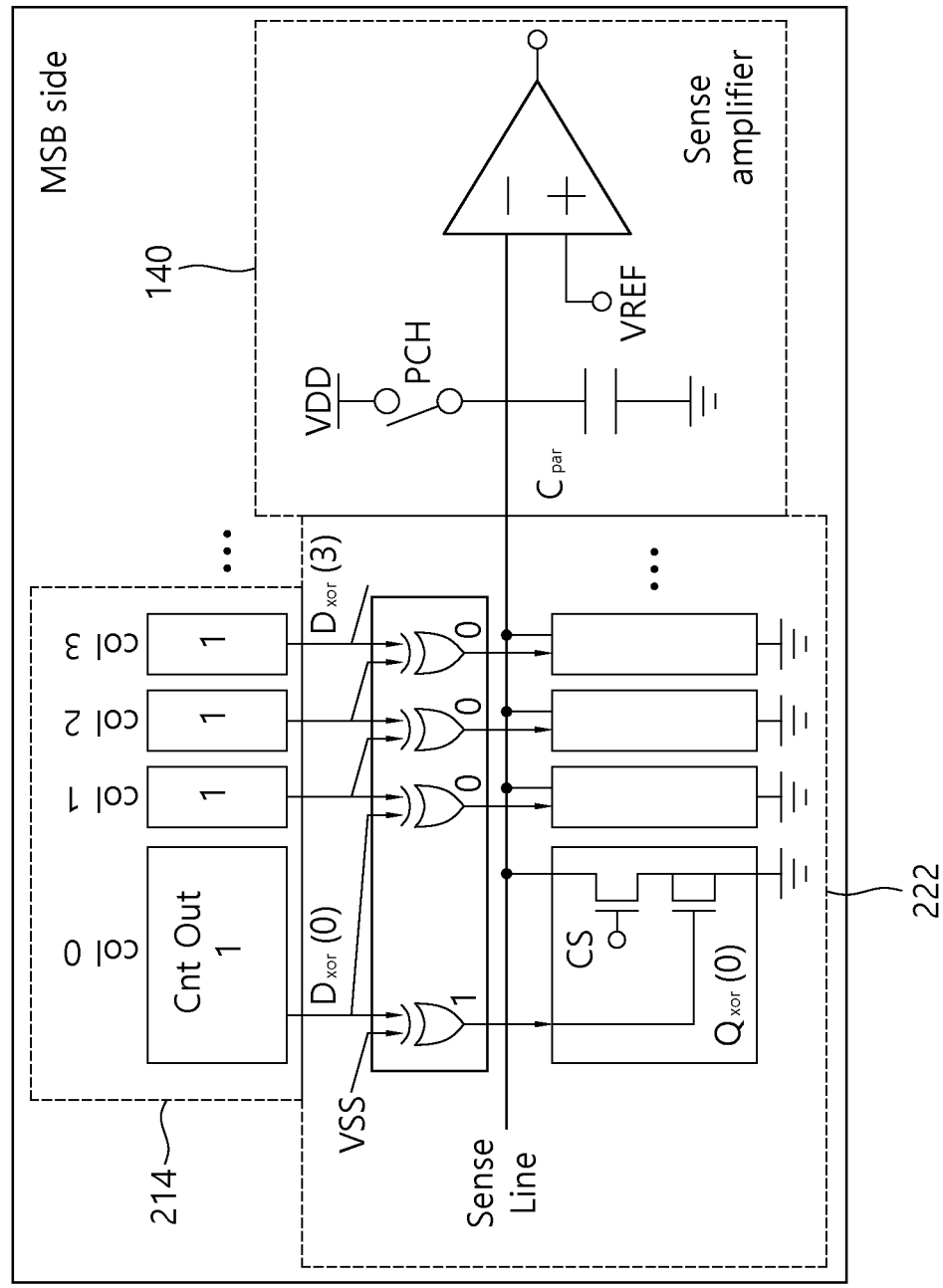
FIG. 8 is a circuit diagram illustrating some configurations of a data reading unit and a data arrangement unit of FIG. 1.
Figure 9:
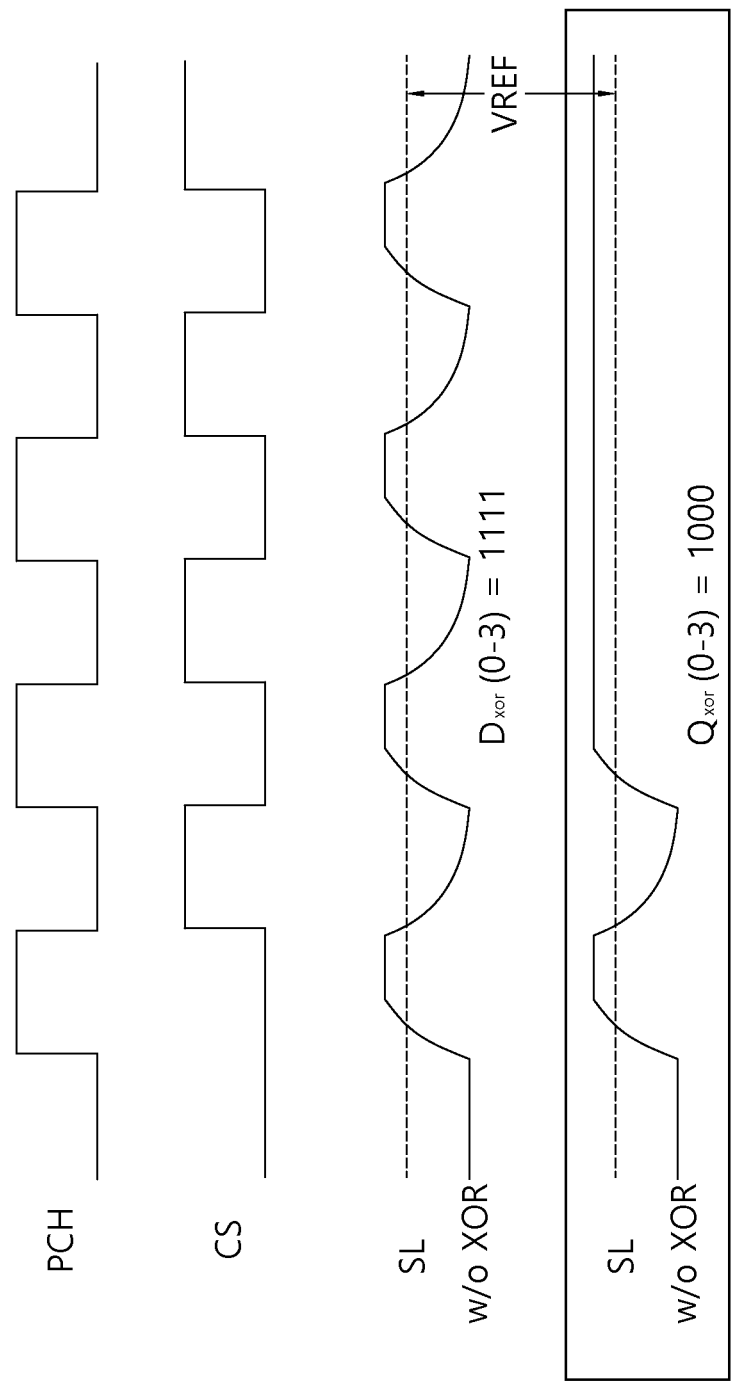
FIG. 9 is a diagram illustrating a signal waveform of the data reading unit of FIG. 8.

FIG. 8 is a circuit diagram illustrating some configurations of a data reading unit and a data arrangement unit of FIG. 1, and FIG. 9 is an example of a diagram illustrating a signal waveform of the data reading unit of FIG. 8.

CIS data have characteristics that data of adjacent pixels are similar, and by applying the characteristics to the data reading units 140 and 220, consumption power may be reduced.

That is, the data reading units 140 and 220 include a shift register (SHR), an XOR logic, a sense amplifier (SA), and a data reading block (220 of FIG. 3) and are portions excluding a digital counter 214 of FIG. 8.

The SHR outputs Q_xor using a digital output of a CNT of the same column and a digital output of a CNT of a previous column as an input of XOR logic. In this case, only in a case of the first column, an output of a CNT of the same column and vss are used as an input.

A discharge circuit includes discharges a current to vss in a sense line to transmit a column signal according to a signal using CS, which is a column selection signal and Q_xor, which is an output of XOR as an input. In the CS, a high level is sequentially output from col 0 to col 3 of FIG. 8 and thus all columns are sequentially discharged in the sense line according to a signal to transfer a digital output signal.

Before discharging the sense line, after a pre-charge TR of a preceding stage of SA makes the sense line to vdd, the sense line is discharged according to a Qxor value. In this case, because parasitic capacitance of the sense line is large, in a discharge circuit, a voltage is lowered to a suitable level instead of making in a digital level of 0 and 1 as in an XOR output and thus the voltage is compared with VREF, which is an input of the SA to generate a final digital output.

According to such a data reading unit 140, as shown in FIG. 9, when comparing a case where D_XOR (0-3) is 1111 without using XOR logic in a bright light environment and a case where Q_XOR (0-3) is 1000 by using XOR logic, it may be determined that a frequency of discharge and pre-charge is reduced in a sense line and thus low power driving is available.

FIG. 10 is a circuit diagram illustrating a configuration of a data transmitting unit of FIG. 1.

Referring to FIG. 10, the data transmitting unit 150 receives two data streams divided according to each color from the data reading unit 140, and transmits the two data streams to four transmitter data paths. The data transmitting unit 150 separates an MSB and an LSB in one multi-bit data stream and transmits the MSB and the LSB to different transmitter data paths (G_MSB, G_LSB, BR_MSB, BR_LSB). By dividing and transmitting data of the MSB side and data of the LSB side of data having the same color among the read data, the data transmitting unit 150 reduces data transition and thus dynamic power may be reduced. Further, in order to reduce consumption of a static current in a driver stage, the data transmitting unit 150 shares a static current of 4-stacked drivers using the 4-stacked drivers in which all of four drivers are stacked. Accordingly, static power consumption can be reduced.

The example embodiments and the accompanying drawings described in the present specification are merely illustrative of some of the technical ideas included in the present disclosure. Accordingly, the example embodiments disclosed herein are for the purpose of describing rather than limiting the technical spirit of the present disclosure, and it is apparent that the scope of the technical idea of the present disclosure is not limited by these example embodiments. It will be understood by those of ordinary skill in the art that various changes in form and details may be made therein without departing from the spirit and scope of the disclosure as defined by the appended claims.

A CIS system and a method of processing the same using a low power multi-mode data path according to the present disclosure have the following effects.

First, the present disclosure can reduce a consumed dynamic current by reducing data transition in a read-out circuit, thereby reducing an amount of power used in an overall circuit.

Second, the present disclosure can improve noise characteristics through reduction of a dynamic current according to data transition.

Third, the present disclosure can be applied to various products using a multi-mode data path and can have flexibility of a product through a mode change to a low power mode and a high speed mode even in the same product.

The effects of the present disclosure are not limited to the above-described effects and the other effects will be understood by those skilled in the art from the following description.

What is claimed is:

1. A complementary metal-oxide semiconductor (CMOS) Image Sensor (CIS) system, comprising:
    a pixel array for outputting pixel data of mergeable 4-shared pixel arrays with arrangement of a plurality of pixels;
    a data arrangement unit having a single data arrangement module to correspond to each of the 4-shared pixel arrays and for merging pixel data of the same color in another row of the 4-shared pixel arrays to rearrange data in a low power mode;
    a data reading unit for performing an exclusive-OR operation of data output from the data arrangement unit to discharge and pre-charge the data when an input voltage of a sense line pull-down circuit is equal to or higher than a high level; and
    a data transmitting unit for dividing and transmitting data of the most significant bit (MSB) side and data of the Least Significant Bit (LSB) side of data having the same color among data read by the data reading unit.

2. The CIS system of claim 1, wherein the data arrangement unit is configured to process to reduce the number of transitions using a unique transition characteristic of the most significant bit (MSB) between adjacent pixel data in a high speed mode.

3. The CIS system of claim 1, wherein the data arrangement unit is configured to arrange data of the same color in all of buffers of two layers in a low power mode and to output the data to the data reading unit, and to alternately arrange data in the buffers of two layers to output the data to the data reading unit in a high speed mode.

4. The CIS system of claim 3, wherein the low power mode comprises an always-on low-power (AO-LP) mode and a photo-shooting low-power (PS-LP) mode, and the high speed mode comprises a photo-shooting high-speed (PS-HS) mode.

5. The CIS system of claim 3, wherein the data arrangement unit comprises:
    an analog multiplexer for determining whether to merge pixel data according to an entire mode using the 4-shared pixels and merging pixel data of the same color positioned in another row;
    a programmable gain amplifier for adjusting a gain;
    a comparator comprising an analog-to-digital converter (ADC) for digitizing analog data; and
    a read-out circuit for outputting to distinguish data according to a color and multi-modes comprising the low power mode and the high speed mode.

6. The CIS system of claim 5, wherein the analog multiplexer is configured to sequentially merge first row data and third row data and merge second row data and fourth row data of the 4-shared pixels in the low power mode.

7. The CIS system of claim 6, wherein the analog multiplexer performs a sequential by-passing process of first row data to fourth row data of the 4-shared pixels without merging in the high speed mode.

8. The CIS system of claim 5, wherein the read-out circuit is configured with a data arrangement block and a data reading block of two layers to correspond to each of the 4-shared pixels.

9. The CIS system of claim 8, wherein the data arrangement block comprises:
    a data path logic for transferring data to any one of buffers of two layers according to multi-modes and a color; and
    a digital counter for counting data to correspond to each of multi-modes.

10. The CIS system of claim 8, wherein the data reading block comprises a shift register.

11. The CIS system of claim 1, wherein the data transmitting unit receives two data streams divided according to each color from the data reading unit to transmit the two data streams to four transmitter data paths.

12. The CIS system of claim 1, wherein the data transmitting unit is configured to share a static current of 4-stacked drivers using the 4-stacked drivers in which all of four drivers are stacked.

13. A method of processing data of a CIS system, the method comprising:

receiving pixel data of mergeable 4-shared pixel arrays to arrange to output data having the same color in buffers of two layers in a low power mode and alternately arranging and outputting the data in the buffers of two layers in a high speed mode;

performing an exclusive-OR operation of the arranged and output data to discharge and pre-discharge the data, when an input voltage of a sense line pull-down circuit is equal to or higher than a high level; and dividing and transmitting data of the most significant bit (MSB) side and data of the least significant bit (LSB) side of data having the same color among the pre-charged data.

14. The method of claim 13, wherein the arranging and outputting of data comprises determining whether to merge the pixel data according to a low power mode and a high speed mode using the 4-shared pixels and merging and analog processing pixel data of the same color positioned in another row.

15. The method of claim 14, wherein the arranging and outputting of data comprises adjusting a gain of the analog-processed data, digitizing the analog data, and outputting to divide data according to each color and multi-modes comprising the low power mode and the high speed mode.

16. The method of claim 13, wherein the arranging and outputting of data comprises sequentially merging first row data and third row data and merging second row data and fourth row data of the 4-shared pixels in the low power mode.

17. The method of claim 16, wherein the arranging and outputting of data comprises performing a sequential by-passing process of the first row data to the fourth row data of the 4-shared pixels without merging in the high speed mode.

18. The method of claim 13, wherein the dividing and transmitting of data comprises transferring two data streams divided on a color basis in the pre-charged data to four transmitter data paths.

19. The method of claim 13, wherein the dividing and transmitting of data comprises sharing a static current of 4-stacked drivers using the 4-stacked drivers in which all of four drivers are stacked.

* * * * *